United States Patent [19]

Licht et al.

[11] 4,433,732
[45] Feb. 28, 1984

[54] CABLE TRAY PROTECTION SYSTEM

[75] Inventors: Richard R. Licht, New Richmond, Wis.; Alan J. Marlor, Minneapolis; Joseph C. Peisert, Saint Paul, both of Minn.

[73] Assignee: Minnesota Mining and Manufacturing Company, St. Paul, Minn.

[21] Appl. No.: 366,098

[22] Filed: Apr. 6, 1982

[51] Int. Cl.³ .............................................. A62C 3/00
[52] U.S. Cl. ...................................... 169/48; 138/92; 138/167
[58] Field of Search ............... 138/155, 157, 159, 167, 138/92; 169/45, 48; 174/68 C, 72 A, 101; 248/49, 58, 68 R; 428/57-59, 920, 921

[56] References Cited

U.S. PATENT DOCUMENTS

| 924,355 | 6/1909 | Howard | 428/57 |
| 4,064,359 | 12/1977 | Peterson et al. | 428/921 |
| 4,069,075 | 1/1978 | Billing et al. | 428/921 |
| 4,164,605 | 8/1979 | Okawa et al. | 428/920 |
| 4,170,675 | 10/1979 | Greengrass | 428/920 |
| 4,223,175 | 9/1980 | Crew et al. | 169/48 |
| 4,360,553 | 11/1982 | Landheer | 428/920 |

Primary Examiner—John J. Love
Assistant Examiner—Jon M. Rastello
Attorney, Agent, or Firm—Donald M. Sell; James A. Smith; Edward T. Okubo

[57] ABSTRACT

A fire protection system for installation about the periphery of a cable tray consisting of parallel side rails and spaced cross members fitted between the side rails and comprising heat expanding, fire retardant composite sheet material joined together to form a protective enclosure around the cable tray and means for mechanically joining sections of the fire protection system are disclosed.

7 Claims, 14 Drawing Figures

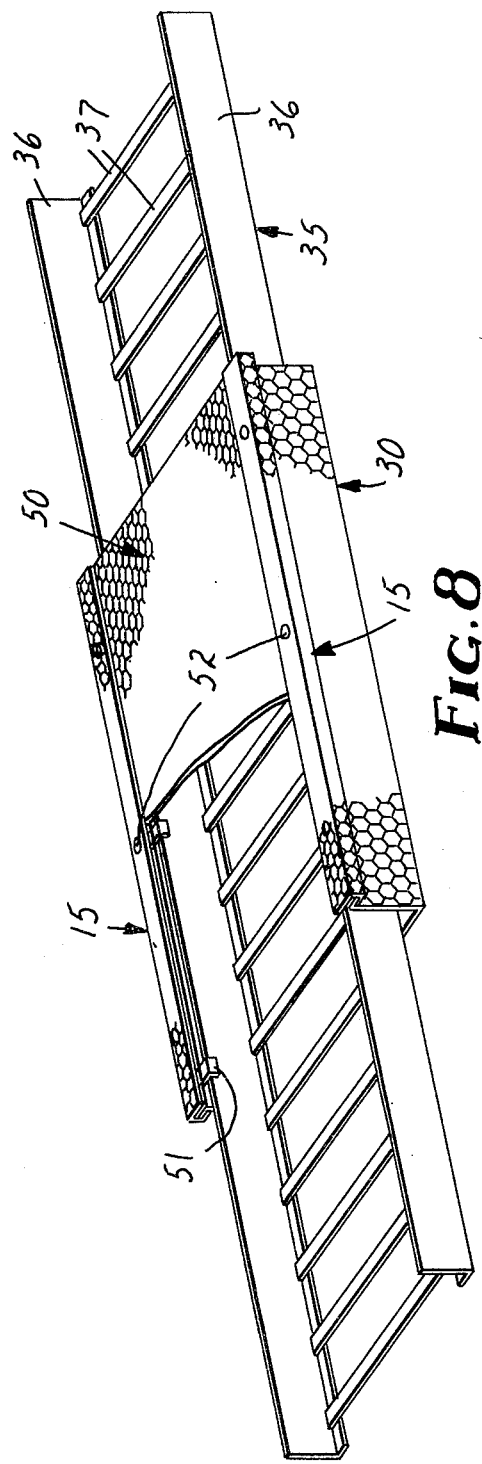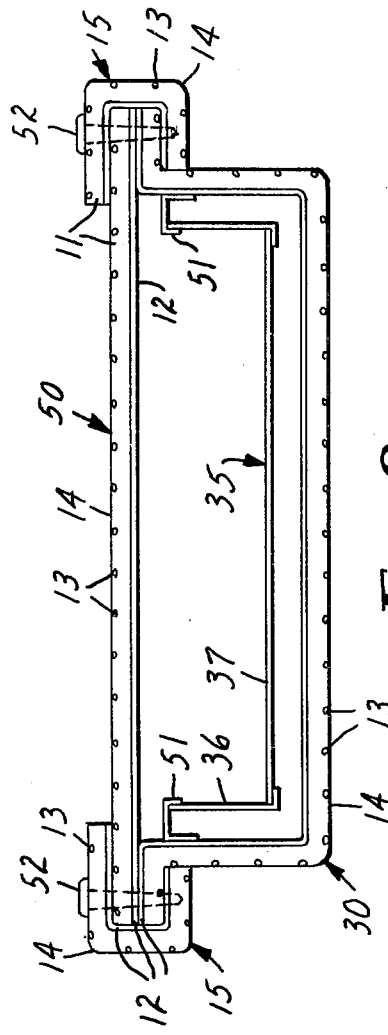
FIG. 8
FIG. 9

CABLE TRAY PROTECTION SYSTEM

TECHNICAL FIELD

The present invention relates to a fireproofing system for standard cable trays particularly those which carry powered cables and/or control cables in nuclear power plants.

One of the most critical aspects of fire protection in nuclear power plants is the assurance that safe shutdown can be accomplished. It is therefore imperative that the fire protection system incorporate features which are capable of limiting fire damage to insure that at least one train of systems (cable trays) necessary to achieve and maintain hot shutdown conditions from either the control room or emergency control station(s) is free of fire damage and that those systems necessary to achieve and maintain cold shutdown from either the control room or emergency control station(s) can be repaired within 72 hours.

In an effort to meet these objectives, redundant trains have been incorporated into the operating systems of nuclear power plants. However, in many existing nuclear power plants, these redundant trains of systems necessary to achieve and maintain hot shutdown conditions are located within the same fire area, usually the cable spreading room, outside of primary confinement. Because these redundant trains are located in the same fire area, a fire could readily threaten the essential operation of all the redundant trains and thus prevent safe shutdown.

In recognition of this serious threat, Appendix R of the Nuclear Regulatory Commission Fire Protection Program for Operating Nuclear Power Plants (10 CFR Part 50) mandates one of the following means for insuring that one of the redundant trains will be free of fire damage:

A. Separation of cables and equipment and associated non-safety circuits of redundant trains by a fire barrier having a 3-hour rating. Structural steel forming a part of or supporting such fire barriers shall be protected to provide fire resistance equivalent to that required of the barrier.

B. Separation of cables and equipment and associated non-safety circuits of redundant trains by a horizontal distance of more than 20 feet with no intervening combustible or fire hazards. In addition, fire detectors and an automatic fire suppression system shall be installed in the fire area; or C. Enclosure of cable and equipment and associated non-safety circuits of one redundant train in a fire barrier having a 1-hour rating. In addition, fire detectors and an automatic fire suppression system shall be installed in the fire area.

The most practical solution to protect redundant trains within the same fire area will, in many situations, be option C above.

While many existing nuclear power plants may have a horizontal separation of 20 feet or more between redundant trains (option B), control of transient combustibles within the intervening distance is difficult to realize in practice. The mandated fire protection is therefore threatened with the potential that safe shutdown may not be achieved.

BACKGROUND ART

Many investigators have attempted to provide fire protection for cable trays. U.S. Pat. No. 4,194,521 relates to a corrugated structure coated with an intumescent material, said structure being used as a tray for supporting insulated electrical cables. This structure is located beneath the cables and will only provide fire protection if the fire starts below the assembly. No fire protection is provided for the sides or top of the cable tray.

Another attempt to provide more fire protection for cables is shown in U.S. Pat. No. 4,276,332 which relates to a fireproof cable tray which completely surrounds the cables. The major disadvantages of this system are its inability to fit around an existing metal cable tray since it is designed to function as the cable tray and, most importantly, its inability to dissipate the heat build-up from resistance loss as power runs through the cables. The predominant reason for supporting cables in trays suspended above the floor is to allow air flow around them for cooling. However, if the tray itself is surrounded by inorganic fiber insulation, heat from the cable will not be dissipated to the surroundings and the cables must be derated. This heat build-up, if allowed to remain unchecked, could also cause a cable tray fire.

U.S. Pat. No. 4,064,359 discloses insulation materials for protecting electrical cables, cable trays or conduits from fire. However, the inherent disadvantage of cable temperature build-up under normal operating conditions still remains a serious problem.

U.S. Pat. No. 4,069,075 relates to intumescent coating materials for structural members and particularly a wire mesh attached to a structural member with a self-adhering char-forming intumescent coating applied thereover and to the structural member.

DISCLOSURE OF INVENTION

The present invention provides a fire protected cable tray assembly which will provide one-hour fire protection and at the same time avoids cable derating.

The invention also provides a system which can be easily installed around existing cable trays and is structurally sound.

Another aspect of the present invention relates to means for mechanically joining sections of the fireproofing system together which will withstand a one-hour fire rating test.

The fireproofing system for cable trays of the present invention comprises an intumescent fire retardant composite sheet material, such as that described in U.S. Pat. No. 4,273,879, having laminated on one major surface thereof a galvanized steel base layer, a wire netting laminated to the other major surface of the composite sheet material and an aluminum foil layer applied over the wire netting. The resulting composite provides a fire retardant sheet material which can be cut and bent into many unique shapes to fit around a cable tray.

The advantage of this intumescent material is its ability to remain in a dense, unexpanded, noninsulating form until exposed to heat or flame at which time it would expand volumetrically up to 8 times to provide an insulating char in sheet form. The aluminum foil is instrumental in directionalizing the expansion of the intumescent material in a direction substantially perpendicular to the plane of the foil layer and the wire netting serves to unify the thus formed insulating char. The unexpanded sheet has a thermal conductivity of 1.56 BTU/in./hr./ft.$^2$/°F. at 95° F.; essentially it is a fair conductor of heat and will allow cable heat dissipation. After expansion, the composite sheet becomes an excellent insulator with a thermal conductivity of 0.35 BTU-/in./hr./ft.$^2$/°F. at 95° F.

The excellent heat dissipation property of the composite sheet was shown when heat dissipation measurements were made on the fireproofing system of the present invention versus a ceramic fiber blanket wrapped system. The temperatures on the outside surface of the cable tray and the inside air were measured as a function of varying amounts of heat (watts/ft.) applied inside each system. Even better heat dissipation was obtained when the top cover panel was perforated with ¼ inch diameter holes spaced 2 inches apart in all directions. These holes will be effectively sealed off after shot exposure to heat.

Cable tray fire barriers fail in one of two general modes: heat transmission or mechanical failure. Of these, mechanical failures predominate. Frequently, fasteners or support systems fail and permit rapid heat transmission to the interior of the cable tray. This mechanical failure problem has been eliminated in the present invention through the use of unique joining channels. These channels permit obtaining a structurally sound, fireproof joint.

BRIEF DESCRIPTION OF DRAWINGS

The present invention will become more apparent from the following detailed description and the accompanying drawings in which:

FIG. 8 is a perspective view showing a portion of a cable tray protection system of the present invention around the cable tray of FIG. 6 and utilizing C-channel joining members of FIG. 3;

FIG. 9 is a sectional view of the cable tray protection system of FIG. 8;

DETAILED DESCRIPTION OF THE INVENTION

Figure 1:
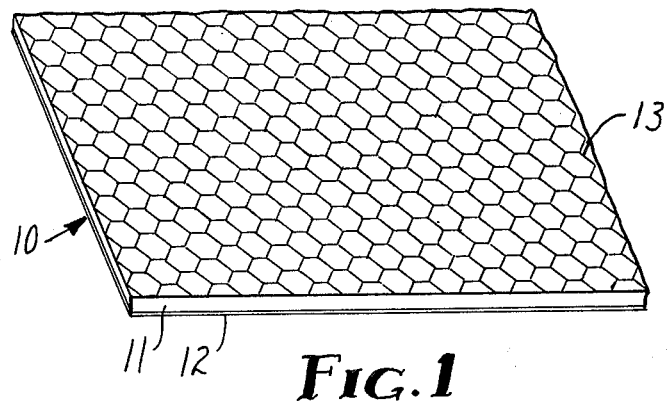
FIG. 1 is a perspective view of the intumescent composite sheet of the present invention viewed with the aluminum foil layer uppermost.
Figure 2:
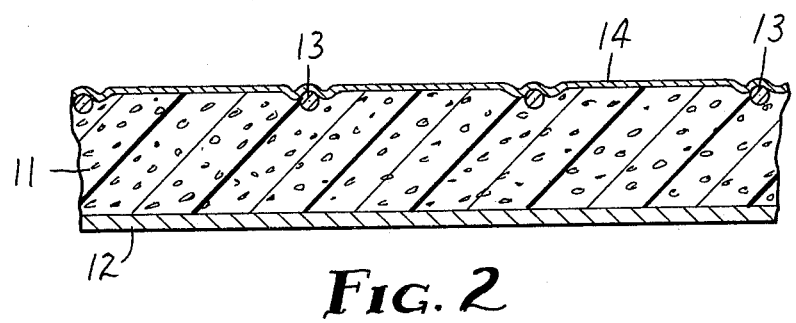
FIG. 2 is a sectional view of the intumescent composite sheet of FIG. 1.
Figure 7:
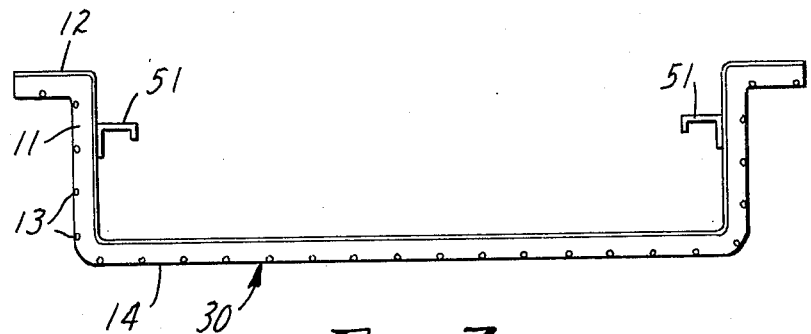
FIG. 7 is a sectional view of a U-shaped bent member of intumescent composite sheet for attachment to the cable tray shown in FIG. 6.

The intumescent composite sheet 10 shown in FIGS. 1 and 2 comprises a flexible, heat expanding, fire retardant composite sheet 11 having an intumescent component in granular form, an organic binder such as an elastomer, an organic char-forming component and fillers such as clay, silica, synthetic organic staple fibers or inorganic fibers such as fiberglass or ceramic fibers, as more fully described in U.S. Pat. No. 4,273,879, which patent is incorporated herein by reference. A galvanized steel base layer 12, 0.005 to 0.025 inch thick, is laminated to one surface of said fire retardant composite sheet 11 and a hexagonal wire netting 13 is bonded to the other surface of the fire retardant composite sheet 11. An aluminum foil 14, 0.002 to 0.005 inch thick, is then bonded over the wire netting 13 to produce composite sheet 10. Due to the physical nature of composite sheet 10, particularly the galvanized steel base layer 12, the sheet can be bent into desired shapes such as the C-channel joining member 15 of FIG. 3, the H-channel joining member 20 of FIG. 4, the right angle-channel joining member 25 of FIG. 5 or the U-shaped bent member 30 of FIG. 7.

EXAMPLE 1

Figure 3:
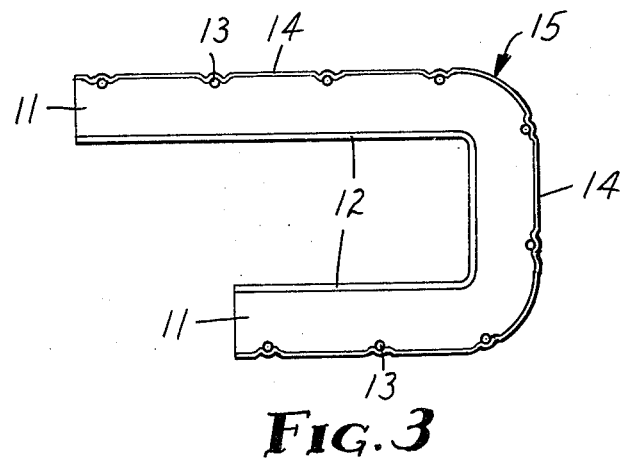
FIG. 3 is a sectional view of a C-channel joining member constructed from the intumescent composite sheet of FIGS. 1 and 2, with the galvanized steel base layer innermost.

A conventional cable tray 35 consisting of parallel side rails 36 and spaced cross members 37 fitted between the side rails 36 with cables 38 resting on cross member 37 was protected from fire using a bent member 30 as the bottom and side portions and a flat composite sheet 50 as the top portion. C-channel joining member 15 was used to unify and protect the joint between the top and side portions. As shown in FIG. 3, C-channel joining member 15 is formed by bending a strip of flat composite sheet 10 into an elongate C-shaped form. As can be seen in FIG. 9, the dimensions of C-channel joining member 15 are such that two thicknesses of flat composite sheet 10 can be accommodated within the throat of the C. The cable tray protection system was also provided with hanging clips 51 on bent member 30 to allow the system to be attached as by hanging onto the cable tray 35. Self tapping screws 52 joined C-channel joining member 15 to the top member 50 and bent member 30. This assembly was fire tested using a small scale Fire Test Furnace generally following ASTM E-119 time-temperature fire curve. This system was fire tested successfully for one hour. The system was loaded with neoprene covered cables 38 and cable temperature and insulation resistivity were measured during the one-hour fire test. Insulation resistivity is measured in megohms and is an indication of the condition of the cable insulation. If the cable insulation resistivity drops to less than 1 megohm, a cable short is expected and is considered a failure. Normal resistivity typically is infinity. Average values obtained on this test are shown in Table 1.

TABLE 1

| Time (min.) | E-119 (°F.) | Furnace (°F.) | Tray Rung (°F.) | Metal (°F.) | Cable (°F.) | Resistance megohms |
|---|---|---|---|---|---|---|
| 05 | 1000 | 962 | 70 | 177/125 | 68 | ∞ |
| 10 | 1300 | 1696 | 94 | 218/205 | 78 | " |
| 15 | 1399 | 1512 | 119 | 226/241 | 89 | " |
| 20 | 1462 | 1442 | 141 | 229/247 | 99 | " |
| 25 | 1510 | 1614 | 154 | 234/252 | 109 | " |
| 30 | 1550 | 1487 | 168 | 246/261 | 118 | " |

TABLE 1-continued

| Time (min.) | E-119 (°F.) | Furnace (°F.) | Tray Rung (°F.) | Metal (°F.) | Cable (°F.) | Resistance megohms |
|---|---|---|---|---|---|---|
| 35 | 1581 | 1438 | 188 | 276/316 | 129 | " |
| 40 | 1613 | 1527 | 219 | 335/455 | 142 | " |
| 45 | 1633 | 1643 | 269 | 406/598 | 168 | " |
| 50 | 1661 | 1646 | 342 | 470/668 | 212 | " |
| 55 | 1681 | 1622 | 442 | 518/714 | 274 | " |
| 60 | 1700 | 1684 | 535 | 552/747 | 345 | 1000 |

EXAMPLE 2

Figure 10:
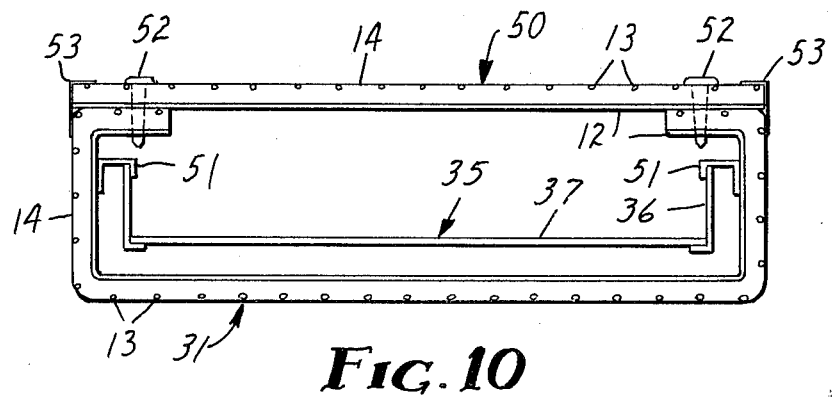
FIG. 10 is a sectional view showing a cable tray protection system constructed without the joining channel members.
Figure 6:
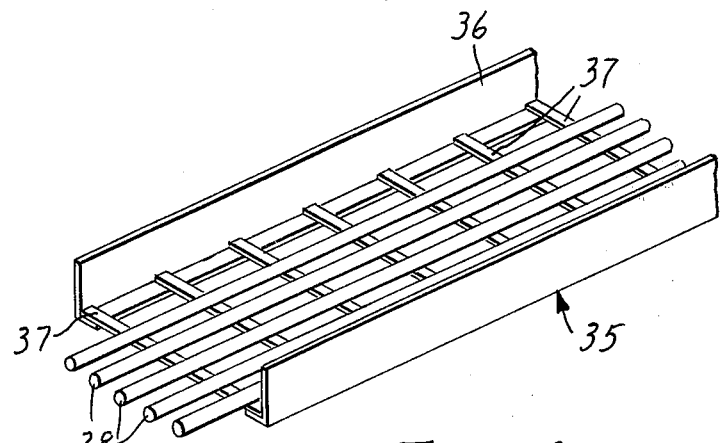
FIG. 6 is a perspective view of a conventional cable tray loaded with cables.

To show the importance of proper jointing, a cable tray protection system was constructed with similar materials as Example 1 but without C-channel joining members 15. A modified bent member 31 and top member 50 were screwed together using self tapping screws 52 as shon in FIG. 10. A strip of aluminum foil tape 53 covered each corner of the joint. A fire test was run in the small scale Fire Test Furnace as in Example 1. After 35 minutes, the interior air temperature was high enough to self-ignite the cable insulation and the test was stopped. After the assembly had cooled, examination showed that the fire retardant composite sheet around the joining seam had split open on both sides, exposing the metal to flame. The time-temperature data for this test are shown in Table 2.

TABLE 2

| Time (min.) | E-119 (°F.) | Furnace (°F.) | Tray (°F.) | Air (°F.) | Metal (°F.) | Cable (°F.) |
|---|---|---|---|---|---|---|
| 0 | 68 | 71 | | | | |
| 5 | 1000 | 770 | 80 | 100 | 191 | 70 |
| 10 | 1300 | 1384 | 108 | 134 | 241 | 84 |
| 15 | 1399 | 1439 | 136 | 153 | 260 | 98 |
| 20 | 1462 | 1461 | 161 | 183 | 274 | 117* |
| 25 | 1510 | 1486 | 228 | 325 | 451 | 188 |
| 30 | 1550 | 1507 | 381 | 481 | 733 | 318 |
| 35 | 1581 | 1556 | 547 | 586 | 809 | 436 |
| 40 | 1613 | | | | | |
| 45 | 1633 | | | | | |
| 50 | 1661 | | | | | |
| 55 | 1681 | | | | | |
| 60 | 1700 | | | | | |

*A rapid temperature rise inside of the system took place after 20 minutes.

EXAMPLE 3

Figure 4:
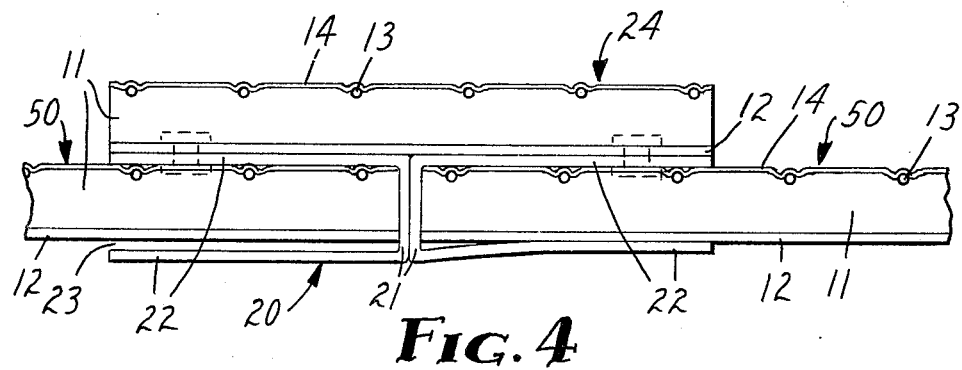
FIG. 4 is a sectional view of an H-channel joining member and shows two intumescent composite sheets of FIGS. 1 and 2 being joined together.

Two fire protected cable tray sections each consisting of a bent member 30 and top member 50 unified with C-channel joining members 15 as in Example 1 were joined together using H-channel joining members 20. H-channel joining member 20 is fabricated by joining two U-shaped sheet metal members together. The joining is suitably accomplished by juxtaposing the bottoms 21 of the two U-shaped members and spot welding them together as shown in FIG. 4. A strip 24 of flat composite sheet 10 is affixed to and covers one surface of H-channel joining member 20. This strip 24 serves to prevent heat transmission through the sheet metal of the H-channel joining member 20 into the interior of the cable tray. As shown in FIG. 4, the two top members 50 (and similarly the horizontal bottom portions of bent members 30) were joined by being inserted into the slots 23 formed by the legs 22 of the H-channel joining member 20. Appropriately sized (shorter) H-channel joining members 20 were used to join the sides of the bent members 30. This configuration of two fire protected cable tray sections joined together using H-channel joining members 20 was fire tested in the small scale Fire Test Furnace using the ASTM E-119 time-temperature fire curve procedure in Example 1. This system was fired successfully for one hour. Average values obtained on this test are shown in Table 3.

TABLE 3

| Time Mins. | Temperature (°F.) | | | | | | |
|---|---|---|---|---|---|---|---|
| | Bottom | Side | Top | Tray | Air | Furnace | E-119 |
| 05 | 123 | 150 | 109 | 70 | 70 | 756 | 1000 |
| 10 | 192 | 210 | 221 | 77 | 78 | 1175 | 1300 |
| 15 | 288 | 237 | 260 | 79 | 95 | 1490 | 1399 |
| 20 | 232 | 253 | 271 | 96 | 109 | 1366 | 1462 |
| 25 | 242 | 267 | 305 | 102 | 118 | 1324 | 1510 |
| 30 | 253 | 300 | 282 | 105 | 126 | 1500 | 1550 |
| 35 | 286 | 346 | 212 | 142 | 140 | 1582 | 1581 |
| 40 | 354 | 409 | 340 | 178 | 173 | 1568 | 1613 |
| 45 | 441 | 426 | 415 | 197 | 219 | 1540 | 1633 |
| 50 | 504 | 457 | 466 | 229 | 264 | 1531 | 1661 |
| 55 | 603 | 500 | 520 | 268 | 303 | 1577 | 1681 |
| 60 | 651 | 530 | 540 | 284 | 337 | 1564 | 1700 |

The cable tray protection system was examined after the test. The char was excellent and no cracks were evident. The C-channel joining members 15 and the H-channel joining members 20 performed well in holding the sections together and eliminating smoke or flame penetration. The fire barrier metal temperature ranged from 530°–651° F. after 60 minutes. The air temperature was 337° F. after 60 minutes. This air temperature would not ignite IEEE 383 type cables.

EXAMPLE 4

Figure 5:
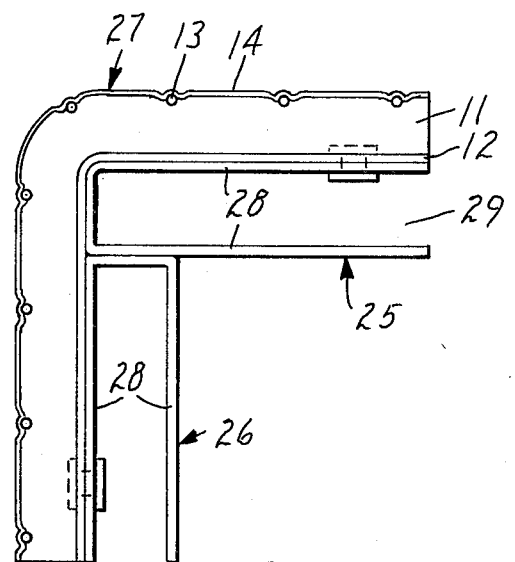
FIG. 5 is a sectional view of a right angle-channel joining member.

The right angle-channel joining member 25 illustrated in FIG. 5 is designed to be used in joining cable tray sections at right angles to each other such as when the cable tray run makes a 90° turn. The right angle-channel joining member 25 is fabricated from two U-shaped sheet metal members 26 with their bottoms joined together perpendicularly and fastened as by spot welding as shown in FIG. 5. A strip 27 of flat composite sheet 10 is fastened as by rivets to the outer surface of the right angle-channel joining member 25 when the joining member is to be used on the outer edge of the joint. The strip 27 would be placed on the inner surface of the right angle-channel joining member for use on the inner edge of the joint. As in the H-channel joining member, flat sheets of composite sheet would be inserted into the slots 29 formed by the legs 28 of the joining member.

EXAMPLE 5

Figure 11:
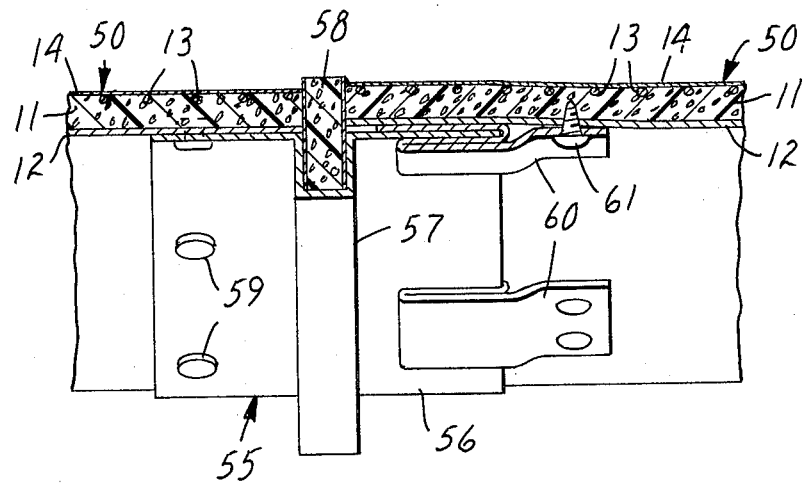
FIG. 11 is a perspective bottom view, partly in section, of a channelled plate joining member and shows two intumescent composite sheets of FIGS. 1 and 2 being joined together.

Another example of a joining technique would be to use the joining plate 55 shown in FIG. 11 to join two cable tray protection system sections. Joining plate 55 comprises a flat plate 56 bisected by a central U-shaped recess 57 within which a strip 58 of fire retardant composite sheet 11 faced on both surfaces with aluminum foil is inserted to provide thermal insulation. As shown in FIG. 11, joining plate 55 is attached along one longitudinal edge to a top member 50 as with screws 59 and placed onto cable tray 35. S-clips 60 are fastened onto the adjoining top member 50 at spaced intervals with self-tapping screws 61 after which top member 50 would be placed onto cable tray 35 and S-clips 60 would be slipped onto the other longitudinal edge of joining plate 55 where they would be frictionally held in place. A fire test of a modified joint utilizing joining plate 55 was successfully run in the small scale Fire Test Furnace as in Example 1. In this modified joint, the two top members 50 were both riveted to joining plate 55 and S-clips 60 were not used. The system was loaded with three neoprene covered cables and cable temperature and insulation resistivity were measured during the 1 hour test. Average values obtained for this test are shown in Table 4.

TABLE 4

| Time Mins. | Temperature (°F.) | | | | |
|---|---|---|---|---|---|
| | Furnace | Seam | Bottom | Cable Tray | Air | Cable |
| 05 | 1221 | 170 | 187 | 76 | 97 | 73 |
| 10 | 1455 | 213 | 209 | 87 | 113 | 81 |
| 15 | 1521 | 230 | 210 | 96 | 122 | 89 |
| 20 | 1678 | 233 | 203 | 104 | 130 | 96 |
| 25 | 1491 | 233 | 218 | 111 | 141 | 105 |
| 30 | 1546 | 266 | 334 | 127 | 173 | 117 |
| 35 | 1565 | 349 | 421 | 156 | 218 | 143 |
| 40 | 1566 | 440 | 473 | 195 | 273 | 185 |
| 45 | 1569 | 555 | 527 | 243 | 330 | 242 |
| 50 | 1582 | 618 | 577 | 285 | 393 | 298 |
| 55 | 1676 | 678 | 633 | 330 | 434 | 351 |
| 60 | 1701 | 733 | 683 | 385 | 487 | 404 |

Cable resistance results showed 1000+ megohms for the full 60 minutes of the test run.

Figure 12:
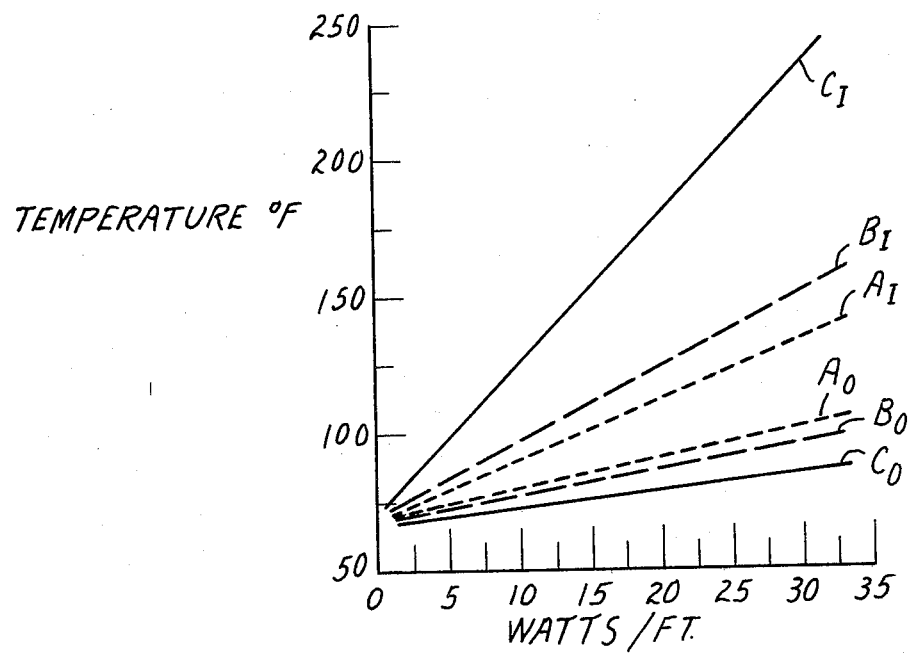
FIG. 12 is a graph showing the heat dissipation characteristics of three cable tray protection systems.

FIG. 12 graphically illustrates the efficacy of the cable tray protection system of the present invention in heat dissipation. Curve $A_o$ shows the outside surface temperature of a cable tray with the cable tray protection system of the present invention installed thereon and with a perforated top member 50. Curve $A_I$ shows the interior air temperature of the same cable tray measured immediately below top member 50. Curves $B_o$ and $B_I$ show the temperatures of a cable tray with the cable tray protection system of the present invention but without perforations in the top member 50. Curves $C_o$ and $C_I$ show the temperatures of a cable tray having a ceramic fiber blanket wrapped around the exterior surfaces of the cable tray.

EXAMPLE 6

Figure 13:
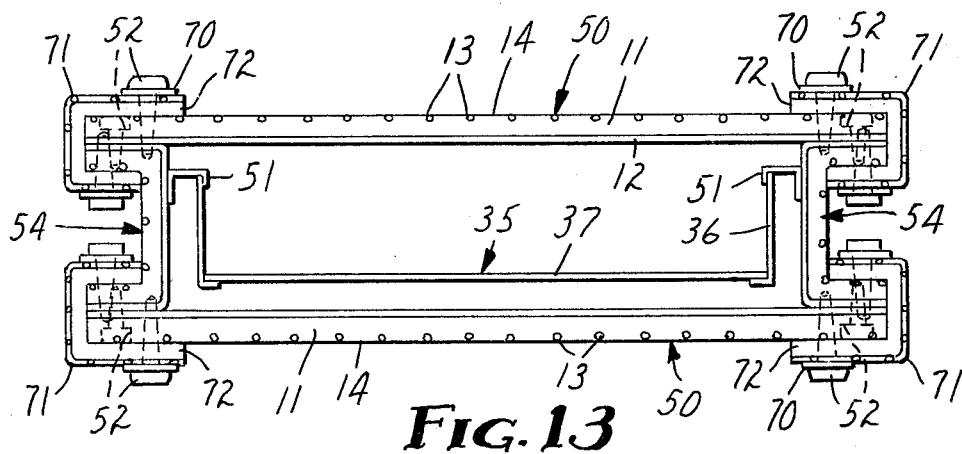
FIG. 13 is a sectional view of another embodiment of a cable tray protection system of the present invention.

A cable tray 35 with cables 38 was protected from fire using bent side members 54 formed from composite sheet 10 and fastened to top and bottom members 50 also formed from composite sheet 10, as shown in FIG. 13. All of these members were fastened together using self tapping screws 52. The joints between the top and side members and bottom and side members were similarly protected by being overlayed with an inorganic intumescent mat 72 comprised of ceramic fibers and unexpanded vermiculite, as more fully described in U.S. Pat. Nos. 3,916,057 and 4,305,992, which patents are incorporated herein by reference. The intumescent mat material will expand up to three times its initial volume upon the application of heat. A wire netting (hardware cloth) 71 with 0.5 inch square welded openings was placed over the intumescent mat to hold it together during expansion. A hardware cloth was attached using oversized washers 70 and self tapping screws 52.

EXAMPLE 7

Figure 14:
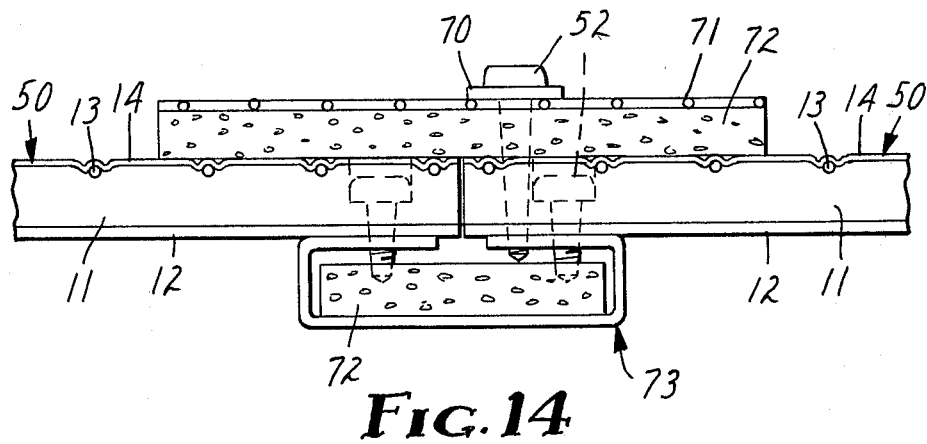
FIG. 14 is a sectional view showing two intumescent composite sheets of FIGS. 1 and 2 being joined together.

Two fire protected cable tray sections were joined together as shown in FIG. 14. As in Example 3, the joints were located on the interior (metal side) of the composite sheets of the cable tray protection system and were required for joining the top, bottom and two side members. A piece of sheet metal was bent into a C-shaped joining channel 73 and a strip of intumescent mat 72 was placed within the channel 73. The two adjoining top members 50 were abutted together and fastened to the C-shaped joining channel 73 using self tapping screws 52. The bottom and two sides of the cable tray protection system were joined in a similar manner. The outer (fire side) of the joint was protected using a strip of intumescent mat 72 held in place with 0.5 inch hardware cloth. The system was fire tested in a small scale Fire Test Furnace as in Example 1. The system was loaded with three neoprene covered cables and air and metal temperatures and cable insulation resistivity were measured during the 1 hour fire test. Average values obtained for this test are shown in Table 5.

TABLE 5

| Time (mins.) | Temperature °F. | | | Resistance Megohm |
|---|---|---|---|---|
| | Furnace | Air | Metal | |
| 05 | 1500 | 75 | 175 | ∞ |
| 10 | 1425 | 110 | 210 | " |
| 15 | 1430 | 140 | 230 | " |
| 20 | 1575 | 150 | 240 | " |
| 25 | 1720 | 160 | 245 | " |
| 30 | 1650 | 165 | 250 | " |
| 35 | 1550 | 175 | 265 | " |
| 40 | 1560 | 10 | 280 | " |
| 45 | 1625 | 250 | 320 | " |
| 50 | 1700 | 300 | 400 | " |
| 55 | 1675 | 350 | 490 | " |
| 60 | 1650 | 395 | 590 | 1000 |

After the test, the cables were examined and no cracks or breaks were observed. A strong one hour protection was obtained.

It will be readily apparent that various modifications of the invention are possible and will readily suggest themselves to those skilled in the art and are contemplated.

I claim:

1. A fire protection system for installation about the periphery of a cable tray consisting of parallel side rails and spaced cross members fitted between the side rails, said fire protection system comprising component members formed from flexible, heat expanding, fire retardant composite sheet material having laminated on one major surface thereof a metal base layer, a wire netting laminated to the other major surface and an aluminum foil layer overlying said wire netting, said component members including a flat bottom portion, upraised longitudinally extending side portions, flanges extending laterally outwardly and parallel to said flat bottom portion along the longitudinal edge of each said side portion, a flat top member comprising a sheet of said fire retardant composite sheet material overlying said cable tray and juxtaposed and supported along its longitudinal edges by said laterally outwardly extending flanges of said side portions, elongated C-channel joining members fabricated from said fire retardant composite sheet material, coextensive with said laterally outwardly extending flanges, frictionally receiving and retaining within the throat thereof the juxtaposed longitudinal edge portion of said flat top member and each said laterally outwardly extending flange, and fastening means securing each said C-channel joining member and said juxtaposed longitudinal edge portion of said flat top member and said laterally outwardly extending flange together, said fire protection system being substantially noninsulating under ordinary ambient temperature conditions but becoming thermally insulating upon exposure to heat or flame.

2. A fire protection system according to claim 1 wherein one of said component members comprises an elongated U-shaped bent member having a flat bottom portion and upraised longitudinally extending side portions with flanges extending laterally outwardly and parallel to said flat bottom portion along the longitudinal edge of each said side portion.

3. A fire protection system according to claim 2 wherein said elongated U-shaped bent member is provided with a plurality of spaced hanging clips along each upraised longitudinally extending side portions thereby to enable said system to be attached to the cable tray.

4. A fire protection system comprising a plurality of fire protection systems according to claim 1 connected together by a plurality of joining members, each said joining member having flat plate-like portions for receiving and retaining thereon the transverse edges of each adjoining member of abutting fire protection systems.

5. A fire protection system according to claim 4 wherein said joining member is an H-channel member comprising two U-shaped members fastened together with their bottoms juxtaposed and having a strip of fire retardant composite sheet covering one major surface thereof, the transverse edges of each adjoining member of abutting fire protection systems fitting between the legs of the H.

6. A fire protection system according to claim 4 wherein said joining member comprises a flat plate bisected by a central U-shaped recess containing a strip of fire retardant composite sheet material, the transverse edge of one adjoining member of one of said plurality of fire protection systems being affixed to said flat plate along one side of said central U-shaped recess, spaced S-clip members affixed along the transverse edge of the other adjoining member of another of said plurality of fire protection systems and frictionally fastened onto said flat plate at spaced points along the other side of said central U-shaped recess.

7. A fire protection system according to claim 4 wherein two said plurality of fire protection systems are joined at right angles to each other by a right angle-channel joining member comprising two U-shaped members fastened together with their bottoms at right angles to each other and having a strip of said fire retardant composite sheet material covering the exposed surfaces of said right angle-channel joining member, the transverse edges of each adjoining member of abutting fire protection systems fitting between the legs of the U-shaped members.

* * * * *